July 19, 1949.  A. J. FINDLAY  2,476,717
APPARATUS FOR RECORDING AND COMPUTING WORKING TIME
Filed May 5, 1945  8 Sheets-Sheet 1

FIG.1

INVENTOR
A.J. FINDLAY
BY Fetherstonhaugh & Co.
ATTORNEYS

July 19, 1949.　　　　　A. J. FINDLAY　　　　　2,476,717
APPARATUS FOR RECORDING AND COMPUTING WORKING TIME
Filed May 5, 1945　　　　　　　　　　　　　　　8 Sheets-Sheet 2

FIG. 2

INVENTOR
A. J. FINDLAY
BY Fetherstonhaugh & Co.
ATTORNEYS

July 19, 1949.    A. J. FINDLAY    2,476,717
APPARATUS FOR RECORDING AND COMPUTING WORKING TIME
Filed May 5, 1945    8 Sheets-Sheet 4

FIG. 4

INVENTOR
A. J. FINDLAY
BY Featherstonhaugh & Co.
ATTORNEYS

July 19, 1949.  A. J. FINDLAY  2,476,717
APPARATUS FOR RECORDING AND COMPUTING WORKING TIME
Filed May 5, 1945  8 Sheets-Sheet 6

FIG. 7

INVENTOR
A. J. FINDLAY
BY Featherstonhaugh & Co.
ATTORNEYS

July 19, 1949.　　　A. J. FINDLAY　　　2,476,717
APPARATUS FOR RECORDING AND COMPUTING WORKING TIME
Filed May 5, 1945　　　　　　　　　　8 Sheets-Sheet 7

FIG. 8

INVENTOR
A. J. FINDLAY
BY Fetherstonhaugh & Co.
ATTORNEYS

July 19, 1949. A. J. FINDLAY 2,476,717
APPARATUS FOR RECORDING AND COMPUTING WORKING TIME
Filed May 5, 1945 8 Sheets-Sheet 8

INVENTOR
A. J. FINDLAY
BY Fetherstonhaugh & Co.
ATTORNEYS

Patented July 19, 1949

2,476,717

UNITED STATES PATENT OFFICE 2,476,717

APPARATUS FOR RECORDING AND
COMPUTING WORKING TIME

Albert J. Findlay, Montreal, Quebec, Canada

Application May 5, 1945, Serial No. 592,251

12 Claims. (Cl. 346—17)

This invention relates to improvements in the time-clock recording of starting and stopping times on an employee's time card and to an improved apparatus for calculating, from such record, the work done by the employee as measured in terms of time and/or labor cost.

The main purpose of the invention is to provide means whereby calculations of pay roll and labor costs and labor distribution and other items from the time-clock record shown on an employee's "pay roll" and "job-costing" time cards may be arrived at in a simpler and faster manner and with less likelihood of error as compared with conventional methods.

Rapid and accurate calculation of totals of elapsed time, labor cost, labor distribution and other items from the conventional time-clock record printed on an employee's time card is made difficult by the fact that the employee's starting and stopping times are printed on the card in hours and minutes. Attempts have been made to overcome this difficulty by having the time-clock print the employee's starting and stopping times in hours and hundredths of hours instead of in hours and minutes. In many instances where this has been done it has been found advisable to revert to the old practice owing to disputes arising between the employee and the time clerk. The average employee is accustomed to the printing of his starting and stopping times in hours and minutes and often does not understand the meaning of printed decimal times such, for example, as the printing of 7:75 instead of the conventional printing of 7:45 which he is accustomed to reading as meaning a quarter to eight. His suspicion and discontent, involving disputes with the time clerk, have influenced many employers to abandon the decimal printing system in spite of its advantages for calculating purposes.

According to the present invention, the employee's time card is provided with a pre-printed time schedule graduated in hours and minutes and also in hours and tenths of hours, the graduations being arranged so that starting and stopping time indications recorded on the card by the time clerk can be read in hours and minutes by the employee and in hours and tenths of hours by the clerk when calculating pay roll and labor costs, labor distribution and other items. The employee's starting and stopping times are recorded by spaced holes punched in the card by the time-clock at different times so that, subject to correction for early or late time-clock punchings marking the beginning and end of a working period or punchings including the noon hour or other non-chargeable time, the duration of any working period shown on the card is measurable as a function of the distance between the punched holes indicating, respectively, the beginning and end of that particular period. The invention also provides measuring or calculating means whereby the distance between any two time-recording holes marking the beginning and end of a working period may be measured and indicated in terms of elapsed time and/or equivalent labor costs.

The time cards used in accordance with the invention are provided with control holes which cooperate with a card stop or control element of the time measuring or calculating means to prevent the inclusion, in the calculations, of non-chargeable time indicated by early starting time indicating holes punched in the card prior to official starting times prescribed by the pre-printed time schedule appearing on the time cards.

The time measuring and calculating means provided in accordance with the present invention also includes means for preventing the inclusion, in the calculations, of non-chargeable time indicated by late stopping time indicating holes punched in the card after the official stopping times prescribed by the pre-printed working schedule appearing on the card.

The invention also provides means for correcting the calculations to eliminate the employee's non-chargeable noon hour or other non-chargeable rest periods prescribed by the pre-printed schedule appearing on the time card.

Other purposes, characteristic features and advantages of the invention will be more readily understood from the following detailed description of the accompanying drawings illustrating a preferred application of the principles involved.

Fig. 2 is a view similar to Fig. 1 but showing a preferred type of employee's job-costing card provided in accordance with the invention, said card being provided with a pre-printed time schedule and control holes similar to those shown in Fig. 1. Fig. 2 also shows the manner in which starting and stopping time indicating holes are punched in the job-costing cards as well as the manner in which the time and labor costs calculated for each job with the aid of the measuring and calculating means provided by the invention are manually posted in appropriate posting columns provided on the card.

Figure 1:
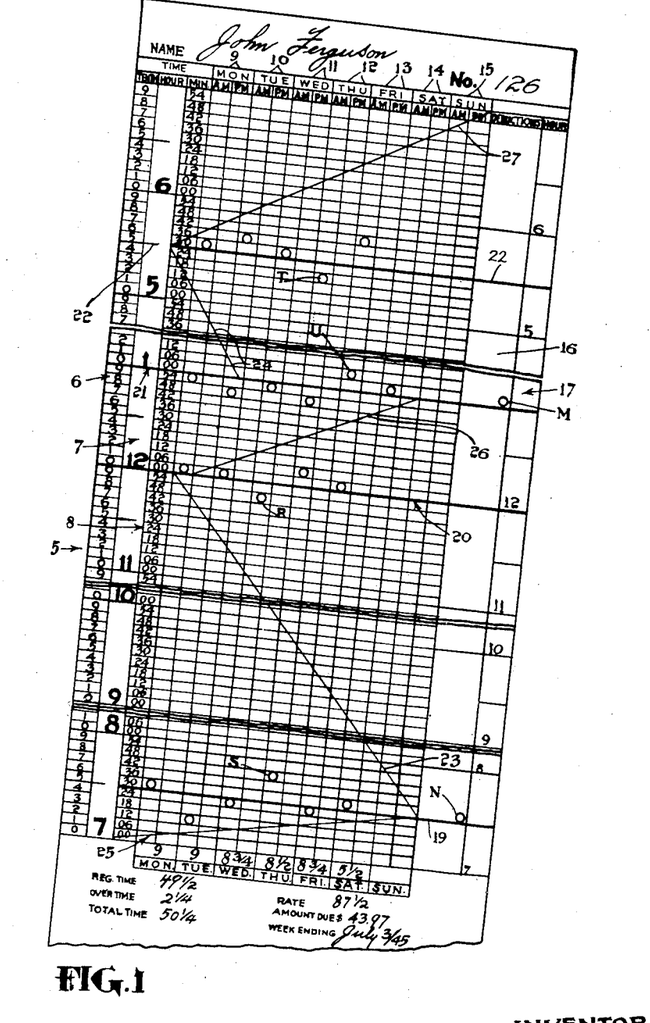
Fig. 1 is a view of a preferred type of employee pay roll card provided in accordance with the present invention. This view shows the pre-printed time schedule and control holes and the manner in which the employee's starting and stopping times are recorded by time-clock recording holes punched in the card. This view also shows the manner in which the time and labor calculations arrived at by the use of the measuring and calculating means provided by the invention are manually posted on the card.
Figure 8:
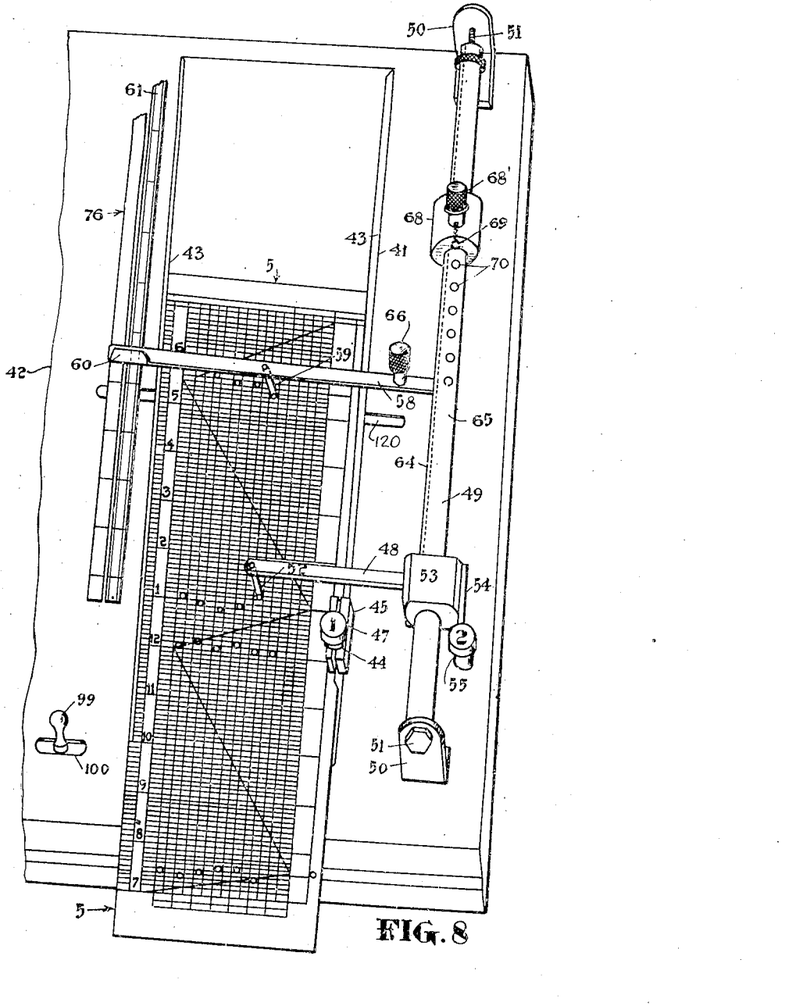
Fig. 8 is a fragmentary perspective view of the measuring or calculating machine as it appears with one of the payroll cards inserted therein for calculating purposes. In this view certain parts that would ordinarily appear have been omitted to permit other parts to be more clearly shown.

The "payroll" card 5, shown in Figs. 1 and 8, is ruled to provide a series of vertical columns, which, reading from left to right, include a "tenths" column 6, an "hour" column 7, a "minutes" column 8, seven daily double-entry time-recording columns 9, 10, 11, 12, 13, 14 and 15, a "deductions" column 16 and a second "hour" column 17.

The "tenths" column 6 is divided horizontally into 120 spaces, each representing one-tenth of an hour. The adjacent "hour" column 7 is divided horizontally into 12 equal spaces, each representing one hour. The "minutes" column 8 is divided into 120 spaces, each representing six minutes or one-tenth of an hour. The 120 spaces of the columns 6 and 8 are aligned and appropriately designated so that fractions of hours can be read in terms of tenths in columns 6 or in terms of minutes in column 8. Each of the horizontal dividing lines of the hour column 7 represents a definite hour as indicated by the numeral appearing thereabove. The horizontal division lines of columns 6, 7 and 8 are continued across the daily time-recording columns 9 to 15 inclusive, so that each of the latter columns is also divided into 120 spaces aligned with the spaces of columns 6 and 8.

Each of the daily time-recording columns 9 to 15 inclusive, is divided vertically into day and night sections respectively indicated by the headings A. M. and P. M. These columns, reading from left to right, cover a period of seven days beginning with Monday as indicated by the printed headings. All day time recordings are calculated on the basis of an official starting time of 7:00 A. M. and are entered in the day sections identified by the A. M. headings. All night time recordings are calibrated on the basis of an official starting time of 7:00 P. M. and are entered in the night sections identified by the P. M. headings.

For present purposes it will be assumed that the official daily working-time schedule runs from 7:30 A. M. to 12:00 noon and from 1 P. M. to 5:30 P. M. These official starting and stopping times are respectively indicated on card 5 by heavy ruled lines 19, 20, 21 and 22. The regular working-time, usually called "company's time," is indicated by an oblique line 23 extending from the morning starting time of 7:30 A. M. to the morning stopping time of 12:00 noon and a second oblique line 24 extending from the afternoon starting time of 1:00 o'clock to the afternoon stopping time of 5:30 P. M. Any time recorded on the card within the fields traversed by the oblique lines 23 and 24 is either late or short time and must be deducted from the regular working-time schedule. The fields traversed by the diagonal lines 25 and 26 are employees' time while the field traversed by the diagonal line 27 may be either employees' time or official overtime.

The circles designated M and N represent control holes which are punched in the right hand side of the card and are used for a purpose hereinafter described. The hole M is aligned with and identifies the official afternoon starting time of 1:00 o'clock. The hole N is aligned with and identifies the official starting morning time of 7:30 o'clock. The additional circles appearing in certain of the daily time-recording columns represent time-recording holes which have been punched in the card by a time-recording clock to indicate the work-starting and work-stopping times recorded by the employee whose name and number appear at the top of the card.

The calculations posted at the bottom of card 5 are based on a schedule of nine working hours a day of five days (Monday to Friday inclusive) and five and a half hours on Saturday, thus making a total of fifty and one-half hours for the pay period. In this connection it is assumed that employee No. 126 is working for a concern which pays overtime, at time and a half, after 48 hours have been worked and that deductions of one-quarter hour are made for every late recording up to 12 minutes, with the same deduction for early quitting or stopping-time recordings.

When card 5 is studied in the light of the foregoing explanations it will be seen that employee No. 126 punched four times in the "company's time" and is therefore liable to a deduction of four quarter hours amounting to one hour short time which, deducted from the scheduled 50½ hour pay period, leaves a total of 49½ hours worked (48 hours regular time and 1½ hours overtime). Since time and a half rate equals one and one-half hours of regular rate it follows that 48 hours regular time, plus one and one-half hours at time and a half equals fifty and one-quarter hours of regular time for which employee No. 126 is entitled to $43.97 at the pay rate of 87½ cents per hour.

The "job-costing" card 29 (Fig. 2) shows the distribution of work done by employee 126 for a 9-hour work day. The manual postings appearing on this card represent the "time" and money value of the labor applied to each particular job.

Card 29 is ruled to provide a series of vertical columns which, reading from left to right, include a "tenths" column 31, a "minutes" column 32, an "hours" column 33, a double entry "time-recording" column 34, a "time-posting" column 35, a "labor-costing posting" column 36, a "job-title posting" column 37, and an "order No. posting" column 38.

Columns 31, 32, 33 and 34 of card 29 are duplicates of the corresponding columns previously described in connection with payroll card 5. The circles H and D shown on card 29 represent control holes corresponding, respectively, to the control holes M and N of card 5. The additional circles shown in the time-recording column 34 of card 29 represent time-recording holes punched in the card by a time-recording clock to record the starting and stopping times of the different jobs worked on by employee No. 126. Each hole indicating the stop time of one job also indicates the starting time of the next job.

The time-recording holes A and B punched in card 29 indicate, respectively, the stopping and starting times of the jig-boring job S-423 which was the last job worked on by employee No. 126. These holes show that job S-423 was started at 2:06 P. M. and finished or stopped at 5:30 P. M., the official stopping time of the prescribed working schedule. Job S-423 therefore required 3 and 4/10 hours of labor which, at the stipulated pay rate of 87½¢ an hour, represents a labor cost of $2.98. These calculations of time and labor cost, together with the job-title and order number, are posted in the appropriately headed posting columns and preferably opposite the starting time of the job.

The 2:06 P. M. starting time of job S-423 is also the stopping time of the preceding grinding job M-198 which, as indicated by the time-recording hole C, was started at 1:30 P. M. The remaining holes punched in column 34 of card 29 show the starting and stop times of the remaining jobs posted as jobs M-162, S-461, M-98, M-142 and S-619. The calculated time and labor costs chargeable against each job being shown by the manual postings opposite the starting time of the job. The total working hours, pay rate and total labor costs are posted as shown in appropriately headed spaces provided at the bottom of card 29.

Figs. 3 to 8 inclusive illustrate the design and assembly of the component parts of the computing machine provided for facilitating the computation of working time and labor costs from the time cards shown in Figs. 1 and 2. This machine includes a card holder 41 mounted on a hollow base 42 and adapted, as hereinafter explained, to be shifted laterally in a step-by-step manner by manually controlled shifting mechanism housed in said base. The card holder comprises a metal plate provided with inwardly directed side flanges 43 forming guide channels for the side edges of the inserted time cards.

Figure 3:
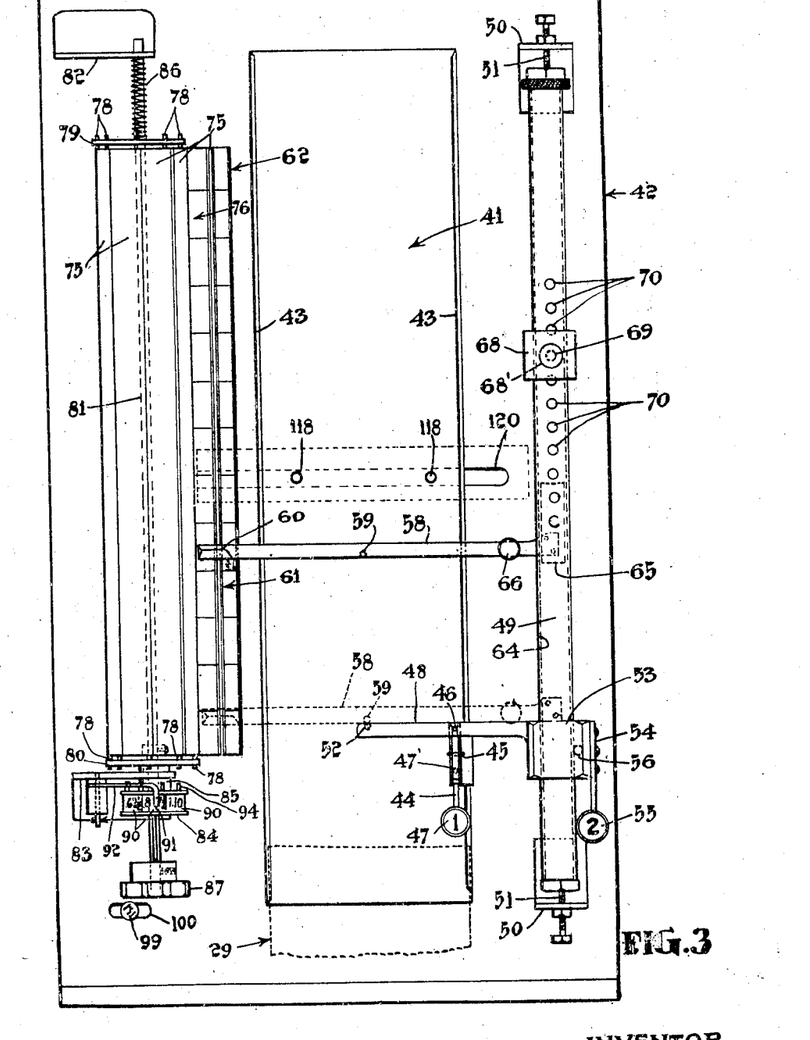
Fig. 3 is a plan view of a measuring or calculating machine provided in accordance with the invention for calculating time and labor costs and labor distribution from the time-clock records shown on the payroll and job-costing cards appearing in Figs. 1 and 2.

A longitudinally extended spring-loaded key 44 overlies the lower right hand portion of card holder 41 and is intermediately pivoted to a bracket 45 fastened to the right hand card holder flange 43. One end of key 44 is provided with a card stop in the form of a depending pin 46 normally bearing against the card holder. The other end of key 44 carries a finger piece 47 which is depressed, against the resistance of the key biasing spring 47', to raise stop pin 46 clear of the card holder.

A second key 48 extends transversely across card holder 41 from a hollow, longitudinally extending tube 49 rotatably mounted on base 42 at the right hand side of the card holder, said tube being supported between brackets 50 by suitable end pivots 51 which are adjustable to accurately position the tube. Key 48 overlies the pin-carrying end of key 44 and is provided, adjacent its free end, with a depending pin 52. The other end of key 48 includes a part 53 which is fitted on and rigidly secured to tube 49 and carries a plate 54 provided with a finger piece 55 which is depressed to revolve tube 49 and raise pin 52 from a normal position bearing on the card holder. The extent to which pin 52 is raised by depressing the finger piece 55 is determined by a stop 56 which underlies and engages the tube-carried part 53 of key 48.

A travelling finder bar 58 also extends across card holder 41 from tube 49 and is provided, intermediate its length, with a depending pin 59 which is normally held against the card holder by the weight of said bar and is in vertical alignment with pin 52 of key 48.

The free end of bar 58 is shaped to provide a pointer portion 60 which traverses the length of an underlying and suitably calibrated time scale 61 fitted in a holder 62 mounted on a raised platform 63 carried by base 42. The other end of bar 58 works in a longitudinal slot 64 provided in tube 49 and is rigidly fastened to a cylindrical guide member 65 slidably and rotatably mounted in said tube. The width of slot 64 permits bar 58 to be raised or swung relatively to tube 49 to lift pin 59 clear of the card holder. This raising of pin 59 is conveniently accomplished by means of a knurled knob 66 secured to bar 58.

Bar 58 is located between key 48 and the upper end of card holder 41 and its permissible range of travel in the direction of the upper end of the card holder is determined by the position of an adjustable bar stop 68 consisting of a sleeve slidably fitted on tube 49. Stop 68 is provided with a spring-loaded ball-detent 69 adapted to be selectively engaged in any one of a series of detent-receiving depressions 70 formed in and spaced along a portion of tube 49. Stop 68 is provided with a knurled knob 68' to facilitate shifting thereof to different positions of adjustment on tube 49. In the present instance the depressions 70 of tube 49 are spaced apart a distance of ½ an inch which, measured in terms of time on time scale 61, equals one-half hour.

Figures 9, 10:
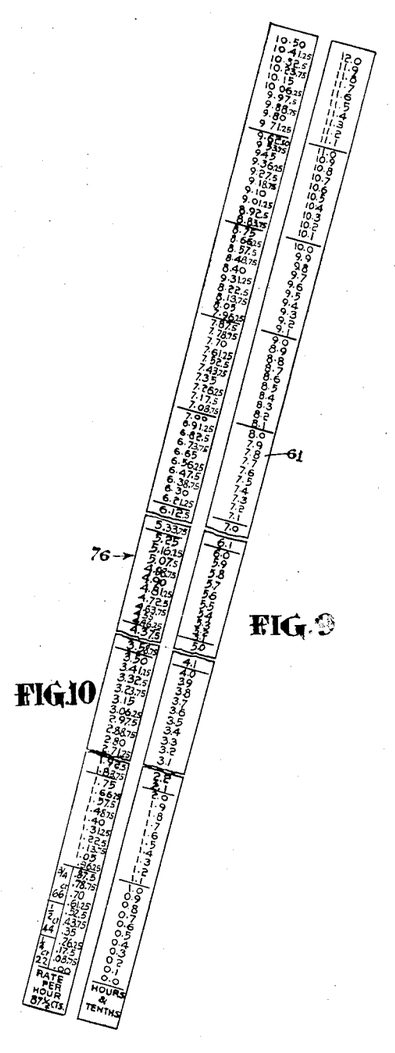
Fig. 9 is a plan view of a time schedule which constitutes an element of the measuring or calculating machine and is graduated in accordance with the graduations of the pre-printed time schedule appearing on the time record card shown in Figs. 1 and 2.
Fig. 10 is a plan view of one of the hourly pay rate schedules which constitutes an element of the measuring or calculating machine and is graduated to show the labor cost or money value of corresponding graduations appearing on the time scale shown in Fig. 9.

The complete time scale 61 traversed by the pointer portion 60 of bar 58 is clearly shown in Fig. 10. It comprises a strip bearing graduations indicating hours and tenths of hours for a 12 hour period, the zero-time indication being at the bottom of the strip. This time scale is fitted in its holder 62 so that all the graduations thereon will be traversed by the pointer portion 60 of bar 58 when the latter is moved from a starting position against the key 48 to or beyond the upper end of the time scale.

A plurality of rate-scale holders 75, each having a different printed pay rate scale 76 removably inserted therein, are adapted to be selectively positioned on the platform 63 beside the time-scale holder 62. One of the rate scales 76, based on a pay rate of 87½ cents an hour, is shown full size in Fig. 10 and is also partially shown in Figs. 3, 7 and 8. This pay rate scale is graduated to show the money value or labor cost of the hours and tenths of hours worked by employees paid at the rate of 87½ cents an hour.

Each rate holder 75 is normally positioned on platform 63 so that the money value or labor-cost graduations of the pay rate scale carried thereby are normally aligned with the equivalent time-indicating graduations of the time scale 61.

Each of the eight rate-scale holders 75 shown in the present drawings is provided with end pivots 78 fitted in suitable holes provided in supporting flanges 79 and 80 fixed to a shaft 81 which is rotatably and slidably supported by brackets 82 and 83 mounted on base 42.

A rate indicator 84 is mounted on shaft 81 by a bearing hub 85 through which the shaft slides when it is shifted longitudinally against the resistance of a biasing spring 86 interposed between flange 79 and bracket 82. Indicator 84 and bearing 85 are slidably keyed to shaft 81 to rotate therewith but are held against sliding movement by bracket 83. An operating knob 87 is fastened to one end of shaft 81 to facilitate the turning and sliding movement thereof.

Indicator 84 is provided with a circular series of index headings 90, each showing the hourly pay-rate basis of the money-value graduations marked on one of the rate-scales 76. These index headings are arranged so that when shaft 81 is rotated to position a particular heading beneath a pointer 91, the pay-rate scale 76 to which the heading applies will be positioned on platform 63 with its money-value graduations in correct alignment with the time-indicating graduations of the time scale 61.

The pointer 91 is constituted by one end of a pawl 92 having its other end pivoted to bracket 83. Pawl 92 is provided with a projection 93 which cooperates with eight pins 94 carried by the indicator 84 to retain shaft 81 in any position to which it is rotated to position a desired rate-scale 76 on platform 63.

Figure 4:
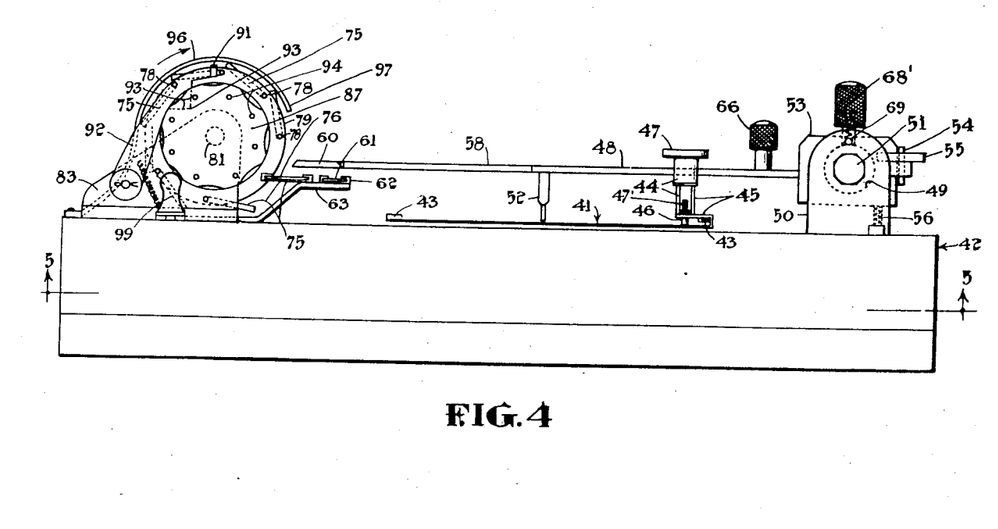
Fig 4 is an end view of the machine shown in Fig. 3.

A hood 96 is arranged to overlie shaft 81 so that, during clockwise rotation of the shaft, as viewed in Figure 4, the scale holders 75 travelling upwardly around the axis of the shaft are engaged by the hood and swung inwardly. One edge 97 of hood 96 is spaced above platform 63 so that each scale holder 75 passing this edge is free to swing outwardly to a horizontal position on platform 63. This outward swinging movement of each scale holder 75 occurs when the index-heading 90, applicable to that particular scale holder, is rotated to a position beneath pointer 91. The pivotal mounting of the scale holders 75 enables them to pass the free end of pointer 60 in an inclined position and to assume a horizontal position after their free edges have passed below said pointer. If desired, the pointer 60 may be swung to an out-of-the-way position during the changing of the rate scales by depressing finger piece 55.

Figure 6:
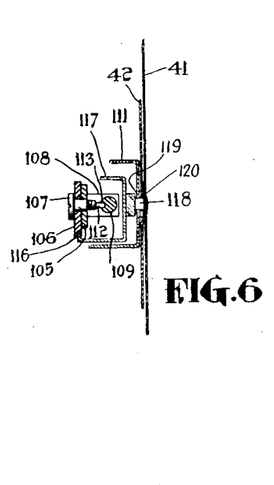
Fig. 6 is a sectional view taken substantially along the section line 6—6 of Fig. 5.
Figure 7:
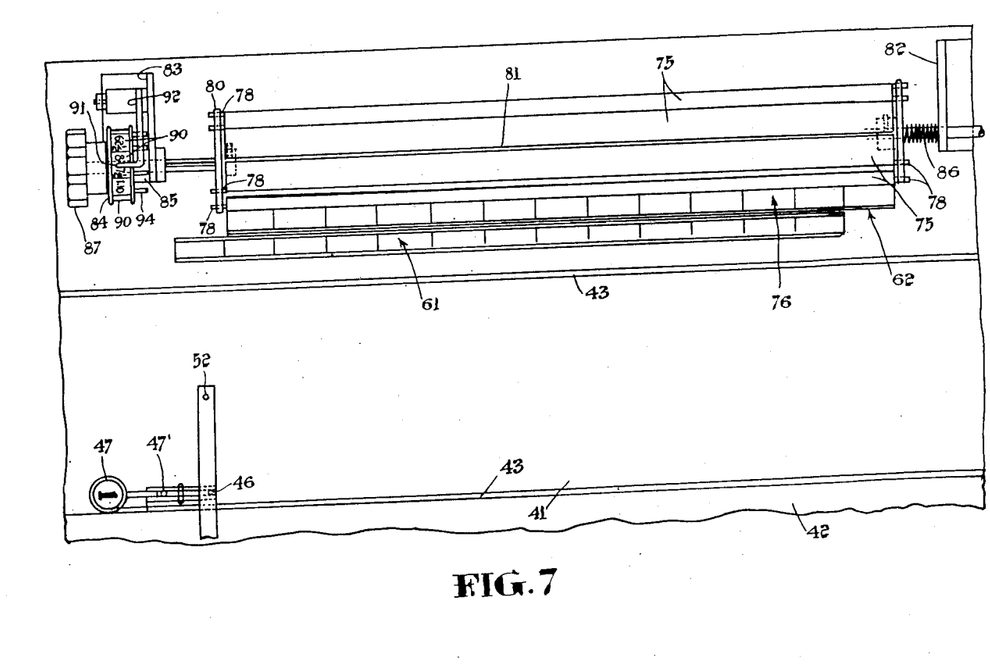
Fig. 7 is a partial top plan view of the measuring or calculating machine as it appears with certain parts shifted to what may be termed the noon hour deducting position for the purpose of preventing the inclusion, in the calculations being made, of the employee's non-chargeable noon hour or lunch period.

Card holder 41 is shiftable laterally on base 42 by mechanism including a vertically disposed operating handle 99 working in a slot 100 provided in the top wall of base 42. In Figures 3, 4 and 7 handle 99 is shown in a neutral position midway between the ends of slot 100. The shifting mechanism controlled by handle 99 operates to effect a step by step movement of the card holder to the left in response to repeated movements of handle 99 from its neutral position toward the right hand end of slot 100. Said mechanism also operates to return the car holder to its starting position in response to a single movement of handle 99 from its neutral position toward the left hand end of slot 100. The shifting mechanism here referred to is shown in detail in Figures 5 and 6. It includes a horizontally disposed lever 102 intermediately pivoted to swing about a vertical pivotal axis 103 and having one end fastened to handle member 99. The other end of lever 102 is pivoted, by pivot stud 104, to one end of a drawbar 105 extending transversely across the interior of base 42. Near its opposite end drawbar 105 carries a pawl 106 pivotally secured thereto by shoulder screw 107 which passes through the drawbar and is threaded into a drawbar guide-block 108 arranged to slide on a round guide shaft 109 mounted in pillow blocks 110 and 110' carried by a stationary channel member 111. Block 108 is free to slide on shaft 109 but is held against rocking movement by a key 112 working in a key-way 113 provided in said shaft. Pawl 106 is located adjacent a pawl-releasing arm 114 formed integral with the end of the drawbar remote from stud 104.

Figure 5:
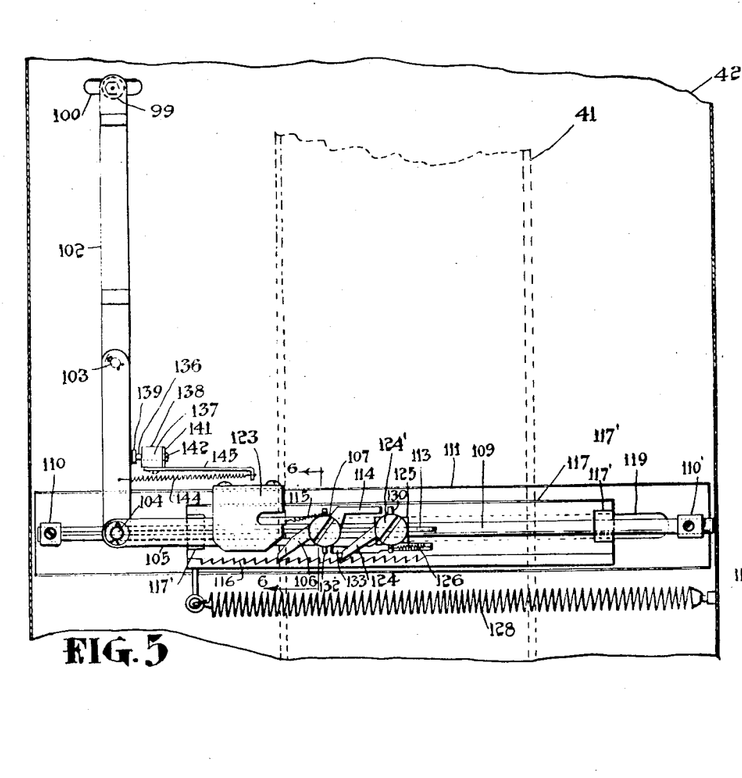
Fig. 5 is a sectional view taken substantially along the section line 5—5 of Fig. 4 and shows, in bottom plan view, a card shifting mechanism for effecting lateral shifting of the card holder forming part of said machine.

A biasing spring 115 normally urges pawl 106 into driving engagement with the teeth of a rack 116 carried by a travelling channel member 117 which is fastened to card holder 41 by rivets 118 working in guide slots 119 and 120 provided, respectively, in the stationary channel member 111 and the top wall of base 42. Travelling channel member 117 is equipped with guide blocks 117' arranged to slide on shaft 109.

When handle 99 is moved toward card receiver 41, drawbar 105 will be moved toward pillow block 110 by lever 102 and pawl 106 will advance rack 116, channel member 117, and card holder 41 the distance of one tooth across base 42 in a direction away from tube 49 and toward platform 63. When the card holder has been advanced this limited distance pawl 106 is engaged and stopped by an overthrow stop 123 which is adjustably secured to stationary channel member 111 so that its position may be changed when it is desired to vary the permissible travel of said pawl.

A holding pawl 124 serves to retain rack 116 in the different positions to which it is advanced by successive movements of drawbar 105 in the direction of pillow block 110. This holding pawl is fastened, by a shoulder screw 124', to a stationary but adjustable block 125 through which shaft 109 extends. Block 125 is provided with a key (not shown) which is forced into binding engagement with the shaft keyway 113 by screw 124' after the block has been correctly positioned on the shaft. A biasing spring 126 urges pawl 124 into holding engagement with the teeth of rack 116 to prevent the rack being pulled back by its return spring 128 when drawbar 105 is returned to its starting position after moving the rack toward pillow block 110.

Card holder 41 is returned to its starting position on base 42 by moving handle 99 to the left hand end of slot 100. This causes drawbar 105 to be shifted a sufficient distance in the direction of pillow block 110' to cause pawl-releasing arm 114 to push against release pin 130 of holding pawl 124 and thereby swing the latter clear of rack 116. At the same time driving pawl 106 is swung clear of rack 116 by engagement of its release pin 132 with a pawl-releasing arm 133 fixed to the stationary block 125 to which retaining pawl 124 is pivoted. As soon as both pawls clear rack 116 the latter is pulled back to its starting position by return spring 128 and carries with it the channel member 117 and the card holder 41.

Handle 99 is yieldingly retained in its neutral position and is automatically returned to said position after each operation thereof by two spring devices acting in opposite directions against lever 102. One spring device comprises a spring-loaded plunger 136 slidably fitted in a transverse guide bore 137 provided in a block 138 attached to the top of base 42. An enlarged end 139 of plunger 136 bears against the card-holder side of lever 102 when handle 99 is in its neutral position midway the ends of slot 100. The other end of plunger 136 bears against a free end of a flat plate spring 141 having its other end fastened to block 138 by screw 142. Spring 141 is stressed when handle 99, as viewed in Fig. 5, is moved toward the left hand end of slot 100 and serves to return the handle to its neutral position when it is released by the operator.

The second spring device comprises a spiral spring 144 connected between lever 102 and spring-anchoring arm 145 attached to block 138. Spring 144 is stressed by movement of handle 99 toward the right hand end of slot 100 and serves, when the handle is released after such movement, to return it to its neutral position against plunger 136. In the neutral position of handle 99 spring 144 holds lever 102 against plunger 136 but does not exert sufficient force on the lever to move the spring-loaded plunger 136 from its handle-centering position.

The use of the machine described herein will be initially explained in connection with computing and posting, in terms of time and labor cost, the distribution of the nine hours of labor recorded by the time-recording holes punched in the "job cost" time card 29 (Fig. 2) of employee 126. For the purpose of this explanation it is assumed that employee 126 is entitled to pay at the rate of 87½ cents per hour for regular time and that the 87½ cent pay rate scale 76 is positioned on platform 63 with its graduations accurately aligned with those of the time scale 62. It will also be assumed that the measuring or finder bar 58 of the machine is arranged in a starting position against key 43 as indicated by dotted lines in Fig. 3.

The upper end of card 29 is inserted in the lower end of card holder 41 as shown in Fig. 3, it being assumed that the card holder is positioned to the right so that, during subsequent upward movement of the inserted card, the time-recording openings punched in time-recording column 34 will travel beneath the aligned pins 52 and 59. After being thus inserted in the card holder, card 29 is pushed upwardly with one hand while depressing the finger pieces 47 and 55 of keys 44 and 48 with the other hand. This permits the upper edge of the card to travel upwardly past the pins 46, 52 and 59 since depression of finger piece 47 lifts pin 46 while depression of key 55 rotates tube 49 so that key 48 and finder bar 58 are raised to lift pins 52 and 59.

As soon as the upper edge of the card passes stop pins 46 and 52 finger piece 47 is released so that key 44 returns to its normal position with pin 46 bearing on the card instead of on the card holder. Finger piece 55 is held in its depressed position until the hole A of card 29, indicating the stopping time of job S-423, has just passed pins 52 and 59. Finger piece 55 is then released and the upward movement of the card continued until such upward movement is stopped by pin 52 entering hole B indicating the starting time of job S-423. Finder bar 58 is then moved upwardly along the stationary card until its further movement is arrested by pin 59 entering hole A. Each tenth of an hour indicated on card 29 and time scale 61 equals a distance of one-tenth of an inch so that the time required for job S-423 is measurable as a function of the distance between holes A and B and is readable on scales 61 and 76 in terms of time and equivalent labor cost with the aid of the pointer portion 60 of finder bar 58 when the measuring pins 59 and 52 are engaged in openings A and B as previously described. In the case of job S-423 the holes A and B, indicating, respectively, the stopping and starting times of this job, are spaced apart a distance of $3\frac{4}{10}$ inches so that the pointer portion 60 of finder bar 58 will indicate on time scale 61 an elapsed time of $3\frac{4}{10}$ hours and will indicate on pay rate scale 76 the equivalent labor cost amounting to $2.97 based on the hourly pay rate of 87½ cents an hour. These ascertained time and labor cost calculations chargeable against job S-423 are then posted on card 29 as previously described in connection with Fig. 2.

As previously stated, the hole B, indicating the starting time (2:06 P. M.) of job S-423, also indicates the stopping time of job M-198 which was started at 1:30 P. M. as indicated by hole C.

When the calculations for job S-423 have been completed and posted finger piece 55 is again depressed to rotate tube 49 just sufficiently to raise pin 52 of key 48 clear of hole B without disturbing pin 59 of finder bar 58, this being made possible by providing sufficient clearance between bar 58 and the side walls of the tube slot 64. Card 29 is then pushed upwardly and, as soon as hole B advances beyond pin 52, finger piece 55 is released to permit pin 52 to drop down on the portion of the upwardly moving card located between holes B and C. This further upward movement of card 29 is continued until arrested by pin 52 entering hole C marking the starting time of job M-198. The bar 58 which has moved upwardly with the card owing to engagement of pin 59 in hole A is then raised by its knob 66 to lift pin 59 clear of hole A without turning tube 49 or disturbing the pin 52 engaged in hole C. As soon as pin 59 is thus raised clear of hole A bar 58 is moved downwardly to engage pin 59 in hole B marking the stopping time of job M-198. Since the distance between holes B and C is six-tenths of an inch the pointer portion 60 of finder bar 58 will indicate on time scale 61 an elapsed time of six-tenths of an hour and will indicate on pay rate scale 76 the equivalent labor cost amounting to 52¢ based on the hourly pay rate of 87½¢ an hour.

At this point it may be explained that when calculating fractions of hours and fractions of cents the nearest cent unit is used. For example, ½¢ and ¾¢ are calculated as 1¢ whereas ¼¢ is calculated as no cents.

The time and labor costs chargeable against each of the remaining job periods shown on card 29 are calculated in the same manner as described in connection with job S-423 and job M-198, the measuring pins 52 and 59 being engaged, respectively, in the time-recording holes marking the starting and stopping of the job period and the distance between said holes being read in terms of elapsed time and equivalent labor costs on the scales 61 and 76 with the aid of the pointer portion 60 of finder bar 58.

Reverting again to card 29, it will be noted that hole E, indicating the starting time of the first morning job S-619, was punched at 7:24 A. M., six minutes before the official starting time of 7:30 A. M. and one-tenth of an hour in advance of control hole D which is aligned with the official starting time. When the machine operator, in calculating the time and labor costs chargeable against job S-619, moves card 29 upwardly in holder 41 to advance hole E toward a position beneath pin 52 of key 48, the card-stop pin 46 of key 44 will drop into hole D and stop the upward movement of the card while hole E is still $\frac{1}{10}$ inch, corresponding to one-tenth hour, below pin 52. Consequently, when pin 59 of finder bar 58 is engaged in hole E', indicating the stopping time of job S-619, the time and labor costs chargeable to this job will be correctly measured and indicated on the scales 61 and 76 as a function of the distance between the hole E' and the official starting time indicated by hole D on the card and not as a function of the distance between the holes E and E', the employee not being entitled to pay for early time recorded on the card prior to the official starting time of the prescribed working schedule.

The total chargeable working time of nine hours and the total labor cost of $7.87 posted at the bottom of card 29 are arrived at in the following manner: Finder bar stop 68 is positioned on tube 49 so that upward movement of finder bar 58 will be arrested by this stop when pin 59 reaches the official work-stopping time of 5:30 P. M. Card 29 is pushed upwardly in card holder 41 until card stop pin 46 of key 44 drops into hole D. Finder bar 58 is then moved upwardly until arrested by stop 68 with the pin 59 located at the official stopping time of 5:30 P. M. The pointer portion 60 of finder bar 58 will then show on time scale 61 a total of 10 hours and will also show on rate scale 76 a total labor cost of $8.75. However, since employee 126 stopped work between the hours of 12:00 noon and 1:00 P. M. for the lunch hour period, it follows that only a net total of nine hours is chargeable as actually working time and that, in arriving at the correct chargeable working time and labor cost total, it is necessary to make provision for deducting one hour's time (representing the non-productive lunch hour period) and its equivalent labor cost money value from the ten hours time and equivalent labor cost of $8.75 shown on the scales 61 and 76 by the pointer portion 60 of finder bar 58. According to the present invention the necessary deduction is obtained by pushing knob 87 of shaft 81 to move said shaft and the rate holder 75 against the resistance of spring 86 and in the direction of bracket 82 until further longitudinal movement of the shaft is arrested by engagement of knob 87 with rate holder 84 as shown in Fig. 7. During this movement shaft 81 and rate holder 62 travel relatively to time scale 61 a distance of one inch which may also be described as a distance of one hour since one hour equals one inch of distance on the time scale 61 and each of the rate scales 76. It will therefore be seen that the aforesaid movement of shaft 81 against spring 86 advances the 87½¢ rate scale 76 relative to time scale 61 a distance corresponding to one hour and in a direction such that, in the advanced position of rate scale 61, the pointer portion 60 of finder bar 58 will indicate a labor cost of $7.87 as the correct total labor cost chargeable for the nine hours actually worked by employee 126 during the scheduled 10-hour working day. At this point it may be noted that the same result can be achieved by shifting both the time scale 61 and the cooperating rate scale 76 a distance of one hour relatively to the finder bar 58 so that the pointer portion of the finder bar will then show on time scale 61 the actual chargeable working time of nine hours and will also show on rate scale 76 the equivalent labor cost of $7.87 for the nine hours actually worked by the employee. This can be accomplished by connecting time scale holder 62 to shaft 81 in any suitable manner so that these parts will travel as a unit when the shaft is moved against the resistance of spring 86.

Reverting again to Fig. 2, it will be noted that job M-162 was started at 11:30 A. M. and completed at 1:30 P. M. as indicated by holes F and C respectively, the noon hour intervening. As indicated by the holes G¹ and G² it is customary for an employee to record on his time card "off" and "on" indications marking the beginning and ending of the lunch period. When this is done two calculations would ordinarily be required to obtain the total actual working time and labor cost for this particular job. In the case of the present invention it is only necessary, when shop regulations permit, for the employee to punch hole F marking the starting time (11:30 A. M.) of job M-162 and hole C marking the stopping time (1:30 P. M.) of said job. The distance between these two holes equals two hours when measured, in terms of time, on the time scale 61 by engaging pin 52 in hole F and pin 59 in hole C. The one hour deduction made necessary by the intervening lunch hour is then obtained by pushing the knob 87 of shaft 81 to shift the rate scale 76 relatively to the time scale 61 so that pointer 60 will indicate on the rate scale a net labor cost of one hour for job M-162.

From the foregoing description it will be seen that inclusion, in the calculations, of any unauthorized late time recorded by punching hole A after the official stopping time of 5:30 P. M. is prevented by setting stop 68 to arrest upward movement of finder bar 58 when pin 59 reaches the official stopping time indication printed on card 29. It will also be seen that inclusion, in the calculations, of any early time recorded by punching hole E prior to the official starting time of 7:30 A. M. is prevented by the aforesaid engagement of pin 46 of key 44 in control hole D.

When the employee is required to punch holes G¹ and G² marking, respectively, the beginning and ending of the lunch hour period, it is necessary to prevent the inclusion, in the calculations, of any late time that may be recorded by punching hole G¹ after 12:00 noon. This is accomplished by setting stop 68 to arrest upward movement of finder bar 58 when pin 59 reaches 12:00 noon on card 29 during calculation of the time spent on job M-162 prior to the beginning of the prescribed lunch hour period.

When calculating time spent on job M-162 after the lunch hour period the inclusion, in the calculations, of any early time recorded by punching hole G² prior to 1:00 P. M. is prevented by reason of the fact that pin 46 of key 44 enters control hole H and stops the upward movement of the card in the card holder before the early punched hole G² is advanced upwardly to a position beneath the pin 52 of key 48. Consequently, the time spent on job M-162 after the lunch hour period is determined as a function of the distance between holes H and C which is a measure of the distance between the afternoon starting time of 1:00 P. M. and hole C.

Referring now to payroll card 5 (Fig. 1) it will be seen that employee 126 worked the full weekly schedule of 50½ working hours with the exception of four irregularities, namely, quitting at 11:48 A. M. instead of 12:00 noon or after on Wednesday as indicated by time-recording hole R; arriving 12 minutes late Thursday morning as indicated by time-recording hole S; quitting 12 minutes early on Thursday evening as indicated by time-recording hole T; and starting late by six minutes Friday noon as indicated by time-recording hole U.

The record shows that employee 126 worked from 7:30 A. M. to 1:00 P. M. Saturday and, as previously explained in connection with "short-time" deductions for time recorded in "company's time," there is a total reduction of one hour, made up of four 15 minute "short-time" deductions, representing the irregularities of the time-record of this particular employee. Employee 126 therefore is paid for working a total 49½ hours, 48 hours of which are chargeable at the regular rate of 87½¢ an hour, the remaining 1½ hours being chargeable at the specified over-time rate of time and a half.

The simplicity of the record shown by card 5 requires very little calculation and since the customary method is to pay over-time after 48 hours have been worked, it is not until the last day of the pay period that the clerk making the calculations becomes interested in over-time rates.

The principal calculation for payroll card 5 is to arrive at the total amount of net working hours after "short-time" has been deducted and over-time added. As previously explained, time and a half rates are usually figured as "time and a half hours" for one hour's working time and, as illustrated on card 5, this is 50¼ hours. As clearly shown in Fig. 10 the hour scale 61 covers a period of 12 hours and is graduated to indicate hours and tenths of hours. The associated rate scale 76 also covers a period of 12 hours and is graduated from zero cents to $10.50 with intermediate graduations showing the labor cost for each one-tenth hour at the rate of 87½¢ per hour. The amount of $43.97 at 87½¢ per hour is obtained by sliding pointer 69 along rate scale 76 to the figures indicating the labor cost for 5 hours and reading these figures as if the decimal point were moved one digit to obtain the labor cost for 50 hours. The odd ¼ hour is then obtained by moving pointer 69 to the fractional divisions of the first set of divisions of the first inch of rate scale 76 thus accounting for the ¼ of an hour and making up the total of $43.97.

While card 5 shows a comparatively simple record of a fixed schedule of working hours with all starting-time and stopping-time recording holes punched in the day sections of the Monday to Saturday daily time recording columns it may be pointed out that, in the case of a large percentage of businesses, particularly departmental stores, paper mills and other establishments that work on a shift basis of 24 hours a day, the payroll record shown on card 5 will be more irregular, showing starting and stopping times recorded by time-recording holes punched in both the day and night sections of the daily entry columns 9 to 15 inclusive and this ordinarily requires a considerable amount of clerical work to extend the elapsed time. For these reasons the procedure followed in using the previously described calculating machine to facilitate computing working time and labor costs from the record shown on payroll card 5 is somewhat different from the procedure previously explained in connection with using said machine for computing time and labor costs from the record shown on the "job-costing" card 29.

When making calculations based on the Monday record shown on card 5 the card holder 41 is arranged in a starting position close to tube 49 so that the time-recording holes punched in the day section of the Monday column 9 will be in vertical alignment with pin 52 of key 48 and pin 59 of finder bar 58 when the upper end of card 5 is inserted in the lower end of card holder 41, the control holes M and N of card 5 being always in vertical alignment with stop pin 46 of key 44 since the latter is carried by the card holder and travels laterally therewith. After the card 5 has been inserted in the card holder the keys 44 and 48 and finder bar 58 are manipulated to permit the card to be pushed upwardly in the card holder until further upward movement of the card is stopped by pin 46 of key 44 dropping into control hole M marking the official afternoon starting time of 1:00 P. M. it being understood that key 44 is released to permit pin 46 to bear on the upwardly moving card as soon as the upper edge of the card is advanced beyond this pin. The finder bar 58 is then moved upwardly against stop 68 which is positioned on the tube 49 to arrest upward movement of the finder bar when pin 59 reaches the official afternoon stopping time of 5:30 P. M. The engagement of pin 46 in control hole M prevents the inclusion, in the calculation of the hours worked Monday afternoon, of any early afternoon starting time recorded by a time-recording hole punched in the card between 12:00 noon and 1:00 P. M. The setting of stop 68 to prevent pin 59 being moved upwardly past the official stopping time of 5:30 P. M. also prevents the inclusion, in the calculations, of any late time recorded by time-recording hole punched in the day section of the Monday column after the official stopping time of 5:30 P. M.

Any short time recorded by an afternoon stopping time-recording hole punched in the Monday column of card 5 prior to the official stopping time of 5:30 P. M. is taken care of by shifting the finder bar 58 to a position in which the pin 59 enters the hole indicating the early afternoon stopping time and the hours worked Monday afternoon are then determined as the function of the distance between the hole M indicating the official afternoon starting time and the early stopping time indicating hole in which the pin 59 of finder bar 58 is engaged.

After completing the calculation for Monday afternoon the operator, noting that no working time has been authorized or recorded in the night section of the Monday time-recording column, operates handle 99 of the card holder shifting mechanism to shift the card holder 41 a suitable distance to the left to bring the time-recording holes punched in the day section of the Tuesday column 10 in vertical alignment with the pin 52 of key 48 and the pin 59 of finder bar 58. In order to accomplish this, two movements of handle 99 from its neutral position to the right hand end of slot 100 are necessary to move the card holder shifting rack 116 a distance of two teeth which corresponds to the full width of each daily entry column including both the day and night sections. After this lateral shifting of the card holder the calculations for hours worked Tuesday afternoon are made in the same way as described for Monday afternoon and this card shifting and calculating procedure is repeated until all the calculations have been completed for the afternoon working hours of Wednesday to Saturday inclusive, and, in some cases, for afternoon hours worked on Saturday and Sunday. After all of these calculations have been completed the handle 99 of the card shifting mechanism is moved from its neutral position to the left hand end of slot 100 to effect an automatic return of the card holder to its initial starting position as previously explained in connection with Figs. 5 and 6. This returns the time-recording holes punched in the Monday column 9 of card 5 to a position of vertical alignment with the pins 52 and 59. The keys 44 and 48 and the finder bar 58 are then manipulated to permit the card 5 to be again moved upwardly in card holder 41 until this further upward movement of the card is stopped by pin 46 of key 44 dropping into control hole N marking the official morning starting time of 7:30. The morning hours worked by employee 126 for the whole week are then calculated in the same manner as explained in connection with calculating the afternoon working hours over Monday to Friday or to Sunday inclusive.

When it is necessary to obtain from card 5 a daily total of hours worked by employee 126 this is accomplished in the following manner: Card 5 is inserted in card receiver 41 when the latter is in its starting position so that the time-recording holes of the Monday column will be in vertical alignment with the pins 52 and 59. Card 5 is then moved upwardly in the card holder until it is stopped by pin 46 of key 44 dropping into control hole N which marks the official starting time of 7:30 A. M. and prevents the card being moved upwardly the distance necessary to include, in the calculation, any early starting time recorded by a starting time recording hole punched in the Monday column prior to the official starting time of 7:30 A. M. The stop 68 is positioned to prevent pin 59 of finder bar 58 being moved upwardly beyond the official stopping time of 5:30 P. M. The finder bar 58 is then moved upwardly until its upward travel is arrested by the stop 68 when the pin 59 reaches the official stopping time of 5:30 P. M. In the case where the employee has stopped work before the official stopping time this will be indicated by a time-recording hole punched prior to 5:30 P. M. and, during its upward movement, the pin 59 will drop into this early stopping time recording hole before the bar 58 reaches the stop 68. In this case the total hours worked on Monday by employee 126 will be indicated, on the time scale 61, as a measure or function of the distance between hole N indicating the official morning starting time and the early afternoon starting time hole in which the pin 59 of finder bar 58 is engaged. The period of time thus measured and indicated on the time scale 51 includes the noon hour period which is then deducted from the calculation by pushing on the knob 87 of shaft 81 to move this shaft and the rate scale 76 relatively to the time scale 61 so that the pointer 60 will indicate on the rate scale, in terms of labor costs, the exact hours worked on Monday by the employee.

The same procedure is employed for obtaining a daily total of hours worked on each of the remaining days of the pay period shown on card 5.

In the event that overtime is authorized and is shown on either card 5 or card 29 by holes punched after the regular stopping time of 5:30 P. M. the stop 68 is moved upwardly on tube 49 to extend the permissible upward travel of the finder bar 58 accordingly so that the pin 59 of this bar may be engaged in authorized time-recording holes punched in the overtime section of the card which lies above the official stopping time of 5:30 P. M.

Having described the nature of my invention and a preferred embodiment thereof, it will be understood that various modifications may be resorted to within the scope and spirit of the appended claims. For example, the present drawings show eight rate scale holders 75 carried by the flanges 79 and 80 of shaft 81 but it will be understood that the number of rate scale holders may be increased by increasing the size of said flanges.

I claim:

1. Apparatus for making calculations from an employee's time card on which the starting and stopping times of each working period are indicated by starting and stopping time indicating holes punched in the card so that the distance between said holes is a measure of the duration of said working period, said card being also provided with control holes indicating official starting times of a prescribed working schedule, said apparatus comprising a starting time locating pin, a card holder in which the card is slidably inserted normally to position the starting time indicating hole of a selected working period directly beneath said pin, a control pin arranged to enter a control hole designating the official starting time of said selected working period to thereby prevent advancement of the starting time indicating hole to the aforesaid position beneath the starting time locating pin when said starting time indicating hole has been punched in the card prior to said official starting time, and a third pin movable over the card holder and card to a position in which it is received in the hole in the card indicating the stopping time of said selected working period.

2. Apparatus as set forth in claim 1, including adjustable stop means cooperating with said third pin to stop the latter at a point on the card corresponding to the official stopping time of said selected working period to thereby prevent engagement of said third pin in the stopping time indicating hole of said working period when said hole has been punched in the card at a time later than the official stopping time and indicating means operated by said third pin to show, in terms of time, the duration of said working period as (a) a function of the distance between the starting time locating pin and the third pin when said pins are respectively inserted in starting and stopping time recording holes punched in the card at authorized starting and stopping times; (b) as a function of the distance between the third pin and the control pin when the starting time indicating hole of the selected working period has been punched in the card prior to the official starting time; or (c) as a function of the actual distance between the third pin and the starting time locating pin when the stopping time is indicated on the card by a hole punched at a time later than the official stopping time.

3. A machine for determining and indicating the duration of a working period as a function of the lineal distance from a starting time indication marked on a time-recording card to a stopping time indication marked on another portion of the card, said machine comprising a card holder, a starting time indicating element beneath which the starting time indication on the card is positioned by sliding the card along the holder, a guide member arranged at one side of the holder in parallel relation therewith, a finder bar movable along the guide member and provided with a measuring element adapted to be positioned at the stopping time indication on the card, a pointer movable with said finder bar and scale means over which the pointer is arranged to travel.

4. A machine as set forth in claim 3 including a stop adjustable on said guide member to limit the travel of the finder bar in a direction away from said starting time indicating element.

5. A machine as set forth in claim 3 including a card stop carried by the card holder and adapted to enter a control hole in the card to prevent the starting time indication on the card being advanced to a position beneath said starting time indicating element when said starting time indication has been marked on the card to indicate a starting time earlier than an authorized official starting time.

6. Apparatus for making calculations from an employee's time card on which the starting and stopping times of each working period are indicated by starting and stopping time indicating holes punched in the card at different points along its length so that the distance between said holes is a measure of the duration of said working period, said apparatus comprising a base, a card holder mounted on said base to receive said time card, calibrated scale means supported by the base at one side of the card holder so that said scale means extend in the longitudinal direction of a time card inserted in said holder, a pair of arms movably mounted on the base for independent travelling movement in the lengthwise direction of a time card inserted in said holder, each of said arms being disposable in a position extending transversely across the card holder, a starting time indicating pin carried by one of said arms and adapted to be inserted in the starting time indicating hole of a selected working period, a stopping time indicating pin carried by the other arm and adapted to be inserted in the stopping time indicating hole of said selected working period, and a pointer element carried by the last mentioned arm and adapted to cooperate with said scale means to visibly show, in terms of time, the duration of said selected working period as a function of the distance between said pins when the latter are inserted in the starting and stopping time indicating holes in said selected working period.

7. Apparatus as set forth in claim 6 in which one end of each arm is slidably and rotatably mounted on the base by a mounting means located at the side of the card holder remote from said calibrated scale means.

8. Apparatus as set forth in claim 6 including an arm pivotally carried by the card holder and a control pin carried by said arm adapted to enter a control hole in the card designating the official starting time of the working period being measured.

9. Apparatus for making calculations from an employee's time card on which the starting and stopping times of each working period are indicated by starting and stopping time indicating holes punched in the card at different points along its length so that the distance between said holes is a measure of the duration of said working period, said apparatus comprising a base, a card holder mounted on the base to receive said time card, a rotatable scale holder mounted on the base at one side of the card holder so that said scale holder extends in the longitudinal direction of a card inserted in said card holder, a plurality of pay rate scales pivotally secured to said scale holder and adapted to be selectively disposed on the base by rotation of said scale holder, a pair of arms movably mounted on the base for independent travelling movement in the lengthwise direction of the card holder, each of said arms being disposable in a position extending transversely across the card holder, a starting time-indicating pin carried by one of said arms and adapted to be inserted in the starting time-indicating hole of a selected working period, a stopping time-indicating pin carried by the other arm and adapted to be engaged in the stopping time-indicating hole of said selected working period and a pointer element carried by the last mentioned arm and cooperating with the pay rate scale disposed on the base to show, in terms of labor costs, the duration of said selected working period as a function of the distance between said pins when the latter are engaged in the starting and stopping time-indicating holes of said selected working period.

10. Apparatus as set forth in claim 6 including means for shifting the card holder laterally on said base.

11. Apparatus of the character described comprising a base, a card holder mounted thereon, a guide member rotatably mounted on the base at one side of the card holder, a pair of arms extending laterally from said guide member, one end of each arm being attached to a supporting member which is slidably supported by said guide member for travelling movement in the longitudinal direction of the card holder, each of said arms being also disposable in a position extending transversely across the card holder, a pin carried by a portion of each arm so that said pin overlies and is directed toward the bottom of the card holder when the arm is disposed in a position extending across the card holder, scale holding means mounted on the base at the side of the card holder remote from said guide member and a pointer element carried by one of said arms and adapted to cooperate with said scale means.

12. Apparatus as set forth in claim 11 including means for shifting the scale means in the longitudinal direction of the card holder.

ALBERT J. FINDLAY.

REFERENCES CITED

The following references are of record in the file of this patent:

UNITED STATES PATENTS

| Number | Name | Date |
| --- | --- | --- |
| 810,370 | Follett | Jan. 16, 1906 |
| 1,059,468 | Johnson | Apr. 22, 1913 |
| 1,081,089 | Bishop | Dec. 9, 1913 |
| 1,505,582 | Bugler et al. | Aug. 19, 1924 |
| 2,229,696 | Engst | Jan. 28, 1941 |